United States Patent [19]

Hudson et al.

[11] Patent Number: 4,780,718

[45] Date of Patent: Oct. 25, 1988

[54] SAR IMAGE ENCODING FOR DATA COMPRESSION

[75] Inventors: Ralph E. Hudson, Los Angeles; Yoji G. Niho, Rancho Palos Verdes, both of Calif.

[73] Assignee: Hughes Aircraft Company, Los Angeles, Calif.

[21] Appl. No.: 745,729

[22] Filed: Jun. 17, 1985

[51] Int. Cl.[4] .............................................. G01S 13/89
[52] U.S. Cl. ....................................... 342/25; 342/196
[58] Field of Search ............. 343/5 CM, 5 FT, 55 A, 343/5 VQ; 342/25, 179, 190-193, 195-197

[56] References Cited

U.S. PATENT DOCUMENTS

| | | | |
|---|---|---|---|
| 3,215,934 | 11/1965 | Sallen | 343/55 A |
| 3,271,765 | 9/1966 | Pulford | 343/5 CM |
| 3,885,224 | 5/1975 | Klahr | 343/5 CM X |
| 3,964,064 | 6/1976 | Brandao et al. | 343/55 A |
| 4,045,795 | 8/1977 | Fletcher et al. | 343/5 CM |
| 4,225,864 | 9/1980 | Lillington | 343/5 FT X |
| 4,594,593 | 6/1986 | Nohmi | 343/5 CM |
| 4,617,567 | 10/1986 | Chan | 342/25 |

FOREIGN PATENT DOCUMENTS

| | | |
|---|---|---|
| 0123573 | 10/1984 | European Pat. Off. |
| 0213268 | 12/1983 | Japan ............................. 343/5 CM |
| 0213269 | 12/1983 | Japan ............................. 343/5 CM |
| 0094092 | 5/1984 | Japan ............................. 343/5 CM |

OTHER PUBLICATIONS

J. M. Schumpert et al., "A Two-Component Image Coding Scheme Based on Two-Dimensional Interpolation and the Discrete Cosine Transform"; Apr. 14-16 1983; pp. 1232-1235; ICASSP83 Proceedings.

Hamed Amor: "Quellencodierung der Feinstrukturkomponenten Hochaufgeloster Biler:; Jan. 1983 (Berlin, DE); pp. 15-20; Fernseh-und Kino-Technik, vol. 37, No. 1.

L. W. Martinson, "A 10MHz Image Bandwidth Compression Model; May 31-Jun. 2, 1978; pp. 132-136; Proceedings of Pattern Recognition and Image Processing (Chicago, IL).

Primary Examiner—Theodore M. Blum
Assistant Examiner—Bernarr Earl Gregory
Attorney, Agent, or Firm—Leonard A. Alkov; A. W. Karambelas

[57] ABSTRACT

A technique is disclosed for encoding SAR image data to achieve data compression. In the image encoding stage, the SAR image is transformed into a list of high reflectivity radar discretes and a small array of frequency filters. In the target list, the location data and intensity levels above the local average background clutter are tabulated for a predetermined number of the highest intensity radar discretes. The array of frequency filters is divided into three zones; the inner, middle, and higher frequency zones relative to the d.c. filter. Only the inner and middle zones of filters are retained and the outer filters are discarded, thus acheiving the desired data reduction. The inner zone filters are quantized to a higher level of precision than the middle zone of filters. The saturation levels of the filters are determined adaptively. In the decoding stage, the original SAR image is reconstructed from the radar discrete list and the small array of frequency filters.

18 Claims, 3 Drawing Sheets

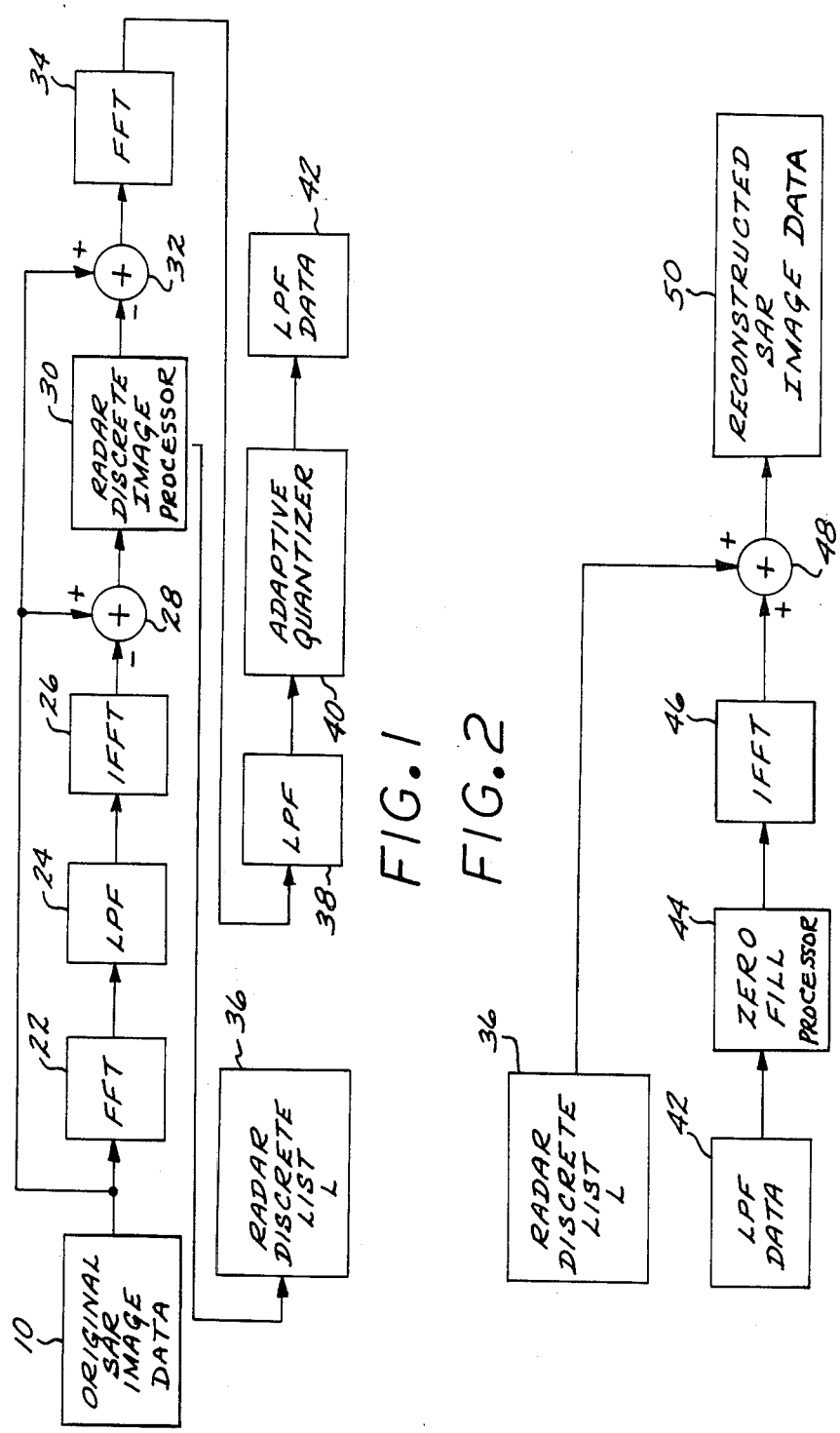

SAR IMAGE ENCODING FOR DATA COMPRESSION

BACKGROUND OF THE INVENTION

The field of the present invention is synthetic aperture radar ("SAR"), and more particularly to techniques for encoding SAR image data to reduce data storage and transmission cost.

A modern SAR system produces imagery at a high data rate. In the standard SAR image representation, the scene being mapped is partitioned into a rectangular array of pixels with a discrete level of intensity assigned to each pixel. The intensity data are explicitly saved in some prescribed sequential order, thereby retaining the location data implicitly. As a result, the total amount of data storage requirement (without any data compression) is the product of the total number of pixels for the scene and the number of bits needed to represent the entire range of intensity levels.

In many applications, the SAR images are stored for subsequent processing and evaluation. The high data rates require large data storage capacities to store the images. If the data is to be transferred over a data communication link, a large link bandwidth is required for high speed transmission of the stored imagery data. A modern SAR image exploitation system is faced with a tremendous amount of data, and must not only have the capability to process SAR imagery at a high data rate, but also to store many SAR images as reference data.

Therefore, there is an urgent need for encoding techniques that reduce the image storage requirements without significantly degrading the interpretability or reference value of the reconstructed image. Such reduction would lead to decreased complexity and decreased data storage cost for a SAR image exploitation system.

In other applications, an efficient encoding technique could make it economically feasible for an airborne (or mobile) radar processor to carry reference SAR images in their encoded form. When a reference image is required, the compressed image could be retrieved and processed to reconstruct the original image. For other applications such as radar navigation, the reference image might be used directly in encoded form. Still another consequence of an efficient encoding technique for SAR image data would be a reduction of the transmission cost of SAR image data due to reduced bandwidth.

SUMMARY OF THE INVENTION

A data compression method for encoding SAR image data is disclosed. In accordance with the invention, the SAR image data is separated into two components, a background clutter image component and a high reflectivity radar discrete image component. The two components are processed and stored separately. The radar discrete image component is processed to retain the brightest radar discretes in a radar discrete list. The background image is transformed to the frequency domain to form groups of frequency filters. An inner group of filters centered about the DC filter is quantized with relatively high precision. A middle group of filters is quantized to a lower level of precision, requiring fewer bits. The higher frequency filters are discarded. Thus, the background image component is stored as quantized frequency domain image data. The stored background image component represents a good approximation of the slowly varying background clutter component of the original image. To reconstruct the SAR image, the background clutter component is zero-filled, filling in the discarded high frequency filters as zero values, and then transformed back to the spatial domain. The radar discrete list is then added to this background clutter image to provide the reconstructed SAR image.

BRIEF DESCRIPTION OF THE DRAWINGS

These and other features and advantages of the present invention will become more apparent from the following detailed description of an exemplary embodiment thereof, as illustrated in the accompanying drawings, in which:

FIG. 1 is a block diagram of an SAR image encoder employing the invention.

FIG. 2 is a block diagram of an SAR image decoder for reconstructing the SAR images encoded by the encoder illustrated in FIG. 1.

DETAILED DESCRIPTION OF THE DISCLOSURE

Figure 3:
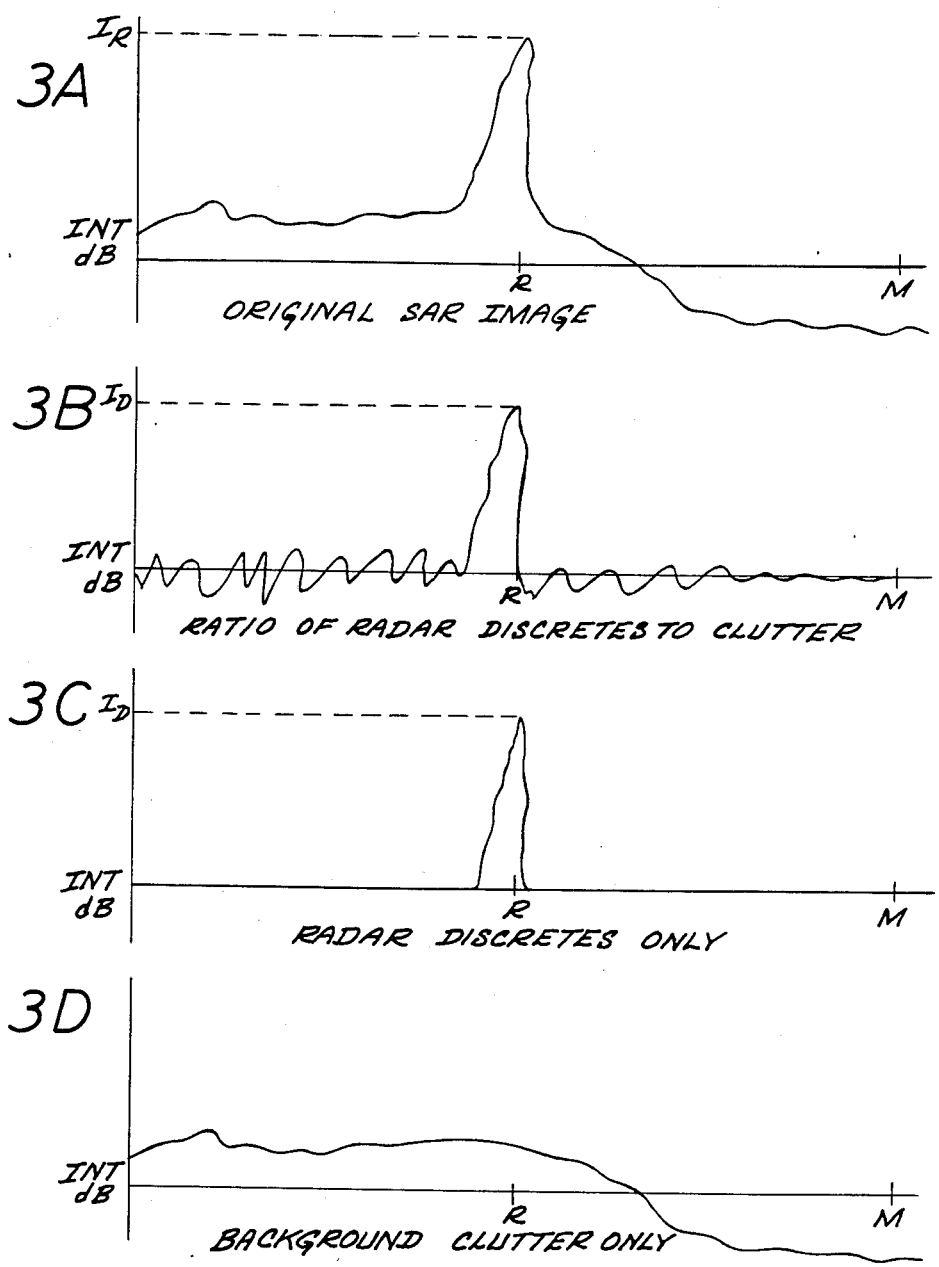
FIGS. 3A-3D are representations of a simplified SAR image, the high reflectivity radar discrete to clutter ratio, the radar image component and the background image component.

The present invention comprises a novel technique for SAR image encoding for data compression. The following description is presented to enable a person skilled in the art to make and use the invention, and is provided in the context of a particular application and its requirements. Various modifications to the exemplary embodiment may be apparent to those skilled in the art, and the present invention intended is to be accorded the widest scope consistent with the principles and novel features disclosed herein.

In general, a SAR image can be considered to consist of echoes received from man-made high reflectivity radar discretes (or targets) along with ground clutter corrupted by scintillation noise. The scintillation noise is multiplicative and becomes additive after logarithmic detection. The additive scintillation noise can be considered to be a high frequency signal and can be significantly reduced by low-pass filtering.

The ground clutter return, on the other hand, occupies a lower frequency spectrum. When an image of clutter return is transformed into the frequency domain, then only the lower frequency filters need to be retained to accurately describe the clutter return.

Unlike clutter and scintillation noise, the high reflectivity radar discrete returns are typically impulse responses with a wide frequency spectrum. Virtually all of the frequency filters should be retained for their accurate reconstruction. In SAR image exploitation, man-made targets are of high importance, and for those high reflectivity radar discretes, it is typically considered essential to minimize any degradation in image quality. However, these radar discretes are usually few in number compared to the total number of pixels in the SAR image.

In accordance with the invention, an encoder is provided which exploits these characteristics of the SAR image. The image encoder separates the SAR image into two image components. One component comprises the background clutter image. The other component comprises high intensity radar discretes. The two components are encoded differently. High intensity radar discretes are tabulated in a radar discrete list, where location and intensity data are explicity saved. The background clutter image is transformed into frequency domain data, and only the lower frequency filters are retained. A decoder may then employed to reconstruct the SAR image from the two image components.

A block diagram of the image encoder is provided in FIG. 1. The original SAR image 10, such as may be provided by an SAR processor, comprises a digitized, logarithmically encoded array of M×M image pixels. For purposes of illustration, M may typically be 512, and the pixel intensity is considered to be defined by an eightbit word.

To obtain the radar discrete component of the SAR image, the complete SAR image 10 is processed by a two dimensional M×M fast Fourier transformer (FFT) 22 and transformed into the M×M complex FFT filters 20 in the frequency domain. This array of complex filters is then processed by low pass filter 24. In this operation, only the J×J FFT filters centered about the DC filter are retained, with all other filters in the M×M array set to zero.

The resulting M×M array of FFT frequency filters is then processed by inverse transformer 26, transforming the M×M array of filters back to the spatial domain. The M×M array of spatial domain data thus obtained is a low frequency version of th original image, and constitutes the first approximation of the average background clutter.

The low-frequency version of the image provided from transformer 26 comprises the slowly varying background clutter return portion of the original SAR image. The bright targets are characterized by rapidly changing intensity values which are removed by the low pass filter processor 24.

At summer 28, the low-frequency background clutter image is subtracted from the original SAR image. The subtraction is performed on a pixel-by-pixel basis for each pixel in the M×M array. The subtraction process is employed because the SAR image data has been logarithmically encoded, i.e., in dB, and the subtraction yields the high reflectivity radar discrete-to-clutter ratio expressed in dB.

FIG. 3A illustrates in simplified form the original SAR image data for a single row or column of pixels in the M×M array. In this simplified illustration, only one radar discrete appears, centered at location R and intensity $I_R$. The background clutter return is slowly varying and of much lower intensity. After the subtraction process carried out by summer 28, the resultant ratio is the radar discrete-to-clutter ratio illustrated in the simplified diagram of FIG. 3B.

In accordance with the invention, a radar discrete list 36 is developed by radar discrete processor 30 from the results of the subtraction. The list 36 is formed by performing a search for local maxima in the radar discrete-to-clutter ratio data, and tabulating the intensity levels and locations (in the M×M array) of a predetermined number L of the highest intensity radar discretes. The differences are sorted by their respective intensity magnitudes, and listed in descending order of intensity magnitude. Only a number (L) of the largest differences are saved in the radar discrete list. The list 36 comprises a list of the row and column indices and respective intensity values above the local average background clutter of these L highest intensity radar discretes. These intensity values are stored with full precision. For the example of FIG. 3, the list would include the location and relative intensity value ($I_D$) of the target located at R in FIG. 3C.

To obtain the clutter component of the image, the radar discrete list 36 is subtracted from the complete SAR image 10 by the second summer 32. The resultant background clutter image consists of the background image with the radar discretes comprising the list 36 removed, thus forming a second difference image (illustrated in FIG. 3D) that is free of target-like responses. This M×M difference image is then processed by the two-dimensional M×M fast Fourier transformer 34 into the frequency domain as an M×M array of FFT frequency filters.

Of the M×M FFT filters, only the N×N filters centered about the DC filter are retained, where M>N>J after processing by low pass filter 38. The value of N is chosen to achieve a particular degree of data compression. The outer, high frequency filters are simply discarded. The remaining filters are divided into two zones of lower frequency filters, the inner and middle FFT filters. This elimination of FFT filters, along with quantization of the inner and middle FFT filters, directly leads to the desired data storage reduction.

The inner zone of FFT filters comprises an I×I array centered around the DC filter, located in this embodiment at array coordinates 257, 257 (M/2+1, M/2+1). In this disclosed embodiment, I is set to 31. The middle zone of FFT filters includes those FFT filters not within the inner zone of filters, but which are within the N×N array of filters centers at the DC filter.

The N×N array of FFT filters passed by low pass filter 38 is quantized by quantizer 40. The inner zone of FFT filters is quantized with more bits than the middle zone of FFT filters. The saturation levels of the quantizer are determined adaptively.

Zonal spectrum encoding is known, wherein the frequency filters are encoded as zones of filters, and the filters in the different zones are represented by different numbers of bits. Insofar as is known to applicants, however, zonal spectrum encoding has not previously been employed to encode background images in which the bright radar discretes have been extracted.

Since the input data to the two dimensional FFT are real, there exists a symmetry in the N×N FFT filters, and only the [(N+1)/2]×N filters need to be retained. Given a two dimensional array of data x(j,k), $0 \leq j \leq M-1$, $0 \leq k \leq M-1$ its two dimensional FFT transform X(n,m), $0 \leq n \leq M-1$ $0 \leq m \leq M-1$ is given by $$X(n,m) = \frac{1}{M^2} \sum_{j,k} x(j,k) e^{-i2\pi(nj+mk)/M}$$

where $i^2 = -1$. Then, if x(j,k) is real, X(n,m) has a complex symmetry $$X(n,m) = X^*(M-n, M-m),$$

where * denotes a complex conjugate operation. Hence, if the filter X(n,m) is saved, the filter X(M−n, M−m) need not be retained. This complex symmetry reduces the number of filters to be retained by a factor of 2.

In this embodiment, each of the [(N+1)/2]×N filters, except the inner group of [(I+1)/2]×I filters, is quantized into a 2K bit complex word, K bits for an in-phase component and K bits for a quadrature component. Each of the inner $[(I+1)/2] \times I$ filters is quantized into a 16 bit complex word. The DC filter has no imaginary component and its magnitude is equal to the average pixel value in the second difference image. Typically this value is greater than the next largest value among all FFT filters by two orders of magnitude. Thus, the DC filter is not included in computing the root mean square value for the inner FFT filters. One 8 bit word is sufficient to represent the DC filter.

Figure 4:
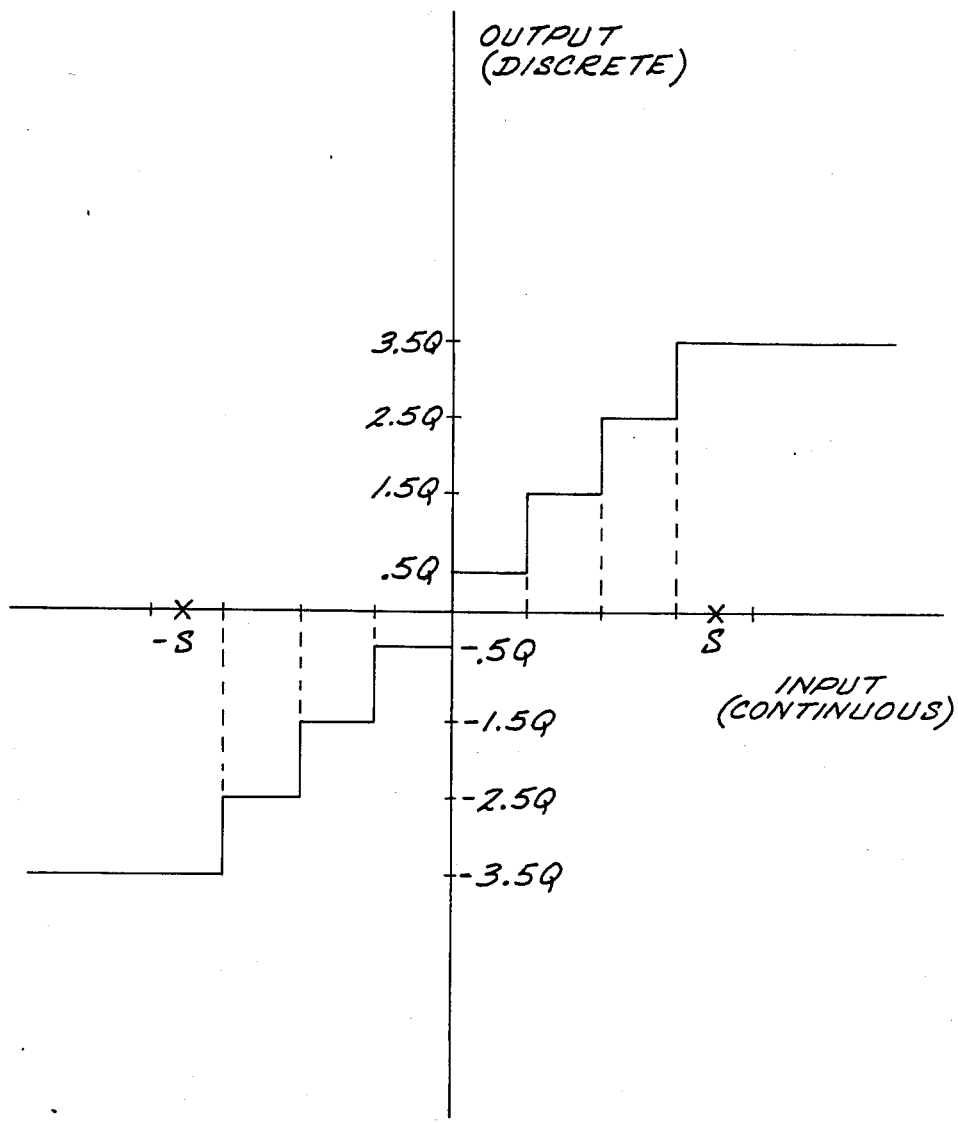
FIG. 4 is a graph representing the operation of the adaptive quantizer employed in the exemplary embodiment.

FIG. 4 depicts the operation of the adaptive quantizer 40 employed in the disclosed embodiment. The figure depicts the quantization of a continuous input into one of the discrete outputs. Each of the M×M FFT filters has associated therewith a real and imaginary part. Each of these parts has associated therewith a magnitude. This magnitude is quantized by the quantizer to K bits, i.e., the quantized magnitude is defined by K Bits. The N×N array of filters is grouped into a set of non-overlapping contiguous square annuli, and the saturation level S and the quantization step Q are computed for each square annulus. The size Q of the quantization steps is related to the number K and to the saturation level S of the filter, i.e., the maximum magnitude for the particular frequency filter.

$$Q = \frac{2S}{(2^K - 1)} \quad \text{(Eq. 1)}$$

Thus, the quantizer receives an input which may range in magnitude over all values. The output of the quantizer is one of the possible discrete states. Thus, for the illustration of FIG. 4, the number of K bits to which the filter is to be quantized is 3, with 8 possible discrete states ranging from $-3.5Q$ to $3.5Q$.

When filters are quantized, the quantization levels as well as the quantization step Q are saved. When the image is reconstructed, the quantization levels must be scaled by Q to get the corresponding discrete levels. For example, in FIG. 4 the quantization levels range from 0 to 7 and quantization step Q. Quantization level 0 may represent a discrete value $-3.5Q$, and level 7 may represent the value $+3.5Q$.

For K=1, the saturation level S is set equal to the root mean square (RMS) value of the magnitudes. For values of K greater than 1, the saturation value S is set to some amount above the RMS value as function of K. The SAR image storage requirement is then reduced by the factor R defined in Equation 2.

$$R = \frac{8 * M^2}{K * N * (N + 1) + (8 - K) * I * (I + 1) + L * (8 + 2 * [\log_2 M])} \quad \text{(Eq. 2)}$$

where [P] denotes the integer greater than or equal to P.

The filtered, quantized background image data 42 comprises an array of $$\left(\frac{N+1}{2} \times N\right)$$

complex values or filters. The higher frequency filters have been discarded, the medium frequency filters are represented by a relatively small number of bits and the lower frequency filters are represented by the larger number of bits.

The background image data 42 is an array in the frequency transform domain and represents an approximation of the background clutter. Data compression has been achieved because the discarded higher frequency filters may be implied, i.e., there is no need to explicitly carry the zero values for the high frequency filters which have been rejected. Moreover, the middle group of filters have not been quantized in full precision, providing further data savings.

Thus, the encoder has functioned to separate the original image into two components, the radar discrete list of the L brightest scatters 36 and the (frequency domain) background image data 42 of FFT filters. Significant data compression has been achieved, as the total number of bits required to characterize the radar discrete list 36 and the background array 42 need only be a small fraction of the data bits required to define the original SAR image, depending on the number of and precision to which the lower and middle frequency filters 42 are stored, as well as the magnitude of the number L.

To reconstruct the SAR image from the stored data, the decoder represented in block diagram form in FIG. 2 is employed. First, the $[N+1)/2] \times N$ quantized FFT filters 42 are retrieved from storage, applied to processor 44, and rescaled according to the saturation levels used. Each of the K bit numbers is rescaled by three steps. The K bit number is treated as an integer between 0 and $2^K - 1$. The result is reduced by subtracting $(2^K - 1)/2$ to yield a signed value between $-(2^K - 1)/2$ and $+(2^K - 1)/2$. This result is then multiplied by a factor $(2S)/(2^K - 1)$ which yields a new result that is between $-S$ and $+S$, where S is the adaptively determined saturation level.

The complex conjugate symmetry relation is then employed to expand the rescaled array 42 into the N×N array of complex filters. The expanded, rescaled array 42 is then processed by a "zero fill" operation carried out by processor 44. By this operation, the N×N low frequency array is reconstructed as an M×M array, by assigning the complex value zero to each of the higher frequency filters which had been discarded.

The zero-filled M×M array is then transformed back into the spatial domain by two-dimensional inverse fast Fourier transformer 46. The resultant spatial domain image is a good approximation of the background clutter comprising the original SAR image, and is added by summer 48 to the radar discrete list 36, retrieved from memory. The addition is on a pixel-by-pixel basis for each pixel location described in the list 36. The result of this addition is the reconstructed SAR image 50. The reconstructed image is a good approximation of the original SAR image.

To further illustrate the disclosed embodiment of the invention, a listing of a computer program is set forth herewith as Appendix A. This program has been developed as a simulator, and is written in VAX/11 Fortran, which is Fortran 77 with extensions by the Digital Equipment Corporation (DEC). The program is written for a VAX 11/780 model computer marketed by DEC, which is interfaced to a Floating Point Systems array processor, model FPS-164, which performs the fast Fourier and inverse fast Fourier transforms. In this embodiment, the functions described in FIGS. 1 and 2 are performed by the digital computers executing the program instructions. While each of the functions, such as fast Fourier transformations and array processing such as zero-filling and subtractions, are known to those skilled in the art, some brief description of this simulator program may assist in understanding the invention.

The program of Appendix A is written to carry out several program subroutines. The subroutine "generate 1pf [low pass filter]image" performs the functions described above with respect to the FFT 22, the low pass filter 24, and the inverse FFT 26 of FIG. 1. In this subroutine, the original SAR image is converted to a 512 by 512 array of complex numbers, with the real component set to the pixel intensity value and the imaginary component set to zero. This array of complex numbers is then fast Fourier transformed in place by a transformation routine called from the array processor. An "J filter by J filter" mask operation is performed on the transformed array. The mask operation zeros all data locations in the array except those located in the J×J array centered around the zero frequency (DC) array location (257, 257 for M×M=512). In the listing of Appendix A, J is set to 15. The "J filter by J filter" mask operation thus performs a low pass filter function on the transform data array. The filtered array is then transformed back to the spatial domain by an inverse fast Fourier routine called from the array processor.

The subroutine "generate tgt [bright radar discrete] list" implements the functions of the summer 28 and the radar discrete processor 30. The routine performs the subtraction, pixel by pixel, of the low frequency image array from the original SAR image array. The routine then forms a histogram of the number of pixels having different intensity values. The histogram is then processed to form the list of the L brightest radar discretes.

For the disclosed program listing, only 0.5% of the pixels, those with the highest intensity, are selected for the list and their intensity values stored in full precision. For the 512×512 array of the disclosed embodiment, the number L is 1311. The choice for the value L was made heuristically. Some images may require a larger radar discrete list, while others may require a smaller list. While in the exemplary embodiment the value of L is predetermined, it is contemplated that the size L of the target list may be adaptively selected by saving only those radar discretes whose signal-to-clutter ratios exceed a predetermined threshold. In addition, many responses in the list are highly correlated, since the list may contain not only the peak radar discrete responses, but also their sidelobe responses. Further storage reduction will be achieved by excluding sidelobe responses from the list.

The subroutine "generate quantized image" is employed to obtain the background image component of the original SAR image. In this subroutine, the radar discrete list is subtracted from the original SAR image array. The resulting M×M array is fast Fourier transformed into the frequency domain. The transformed array of complex valued FFT filters is processed to obtain a set of standard deviation values (variable "sigma") used to set the saturation levels of the filters.

The saturation level and the quantization are also a function of the selected data reduction factor. If the selected data reduction is less than or equal to the factor of ten, then the quantization variable for the number of bits employed to define each quantized variable is set to 2; if the selected data reduction factor is greater than ten, this number of bits is set to 1. A multiplicative factor or scaler is derived to scale the standard deviation to provide the saturation level. In this embodiment, the scaler is set to 2 if the data reduction factor is ten or less; for reduction factors over ten, the scaler is set to 1.

In this embodiment, each FFT filter of the inner group or zone is quantized to 16 bit (complex) precision. Each FFT filter of the middle zone is quantized to 2 or 4 bits K of precision. For this simulation, the outer group of filters are set to zero; in an operational application, these filters are simply discarded. The resulting data then defines a small array of FFT filters.

To reconstruct the SAR image, the subroutine "reconstruct image" is called. (For this simulation program, since the higher frequency filters were set to zero, no zero-fill operation is required.) The stored FFT data representing the background image is transformed back into the spatial domain by an inverse transformation routine called from the array processor to provide a reconstructed background image. The radar discrete list is added to the background image to reconstruct the SAR image.

Tests indicate that the SAR images do not suffer serious degradation for 10:1, 20:1 or 25:1 data reduction levels. The most discernable effect at lower reduction levels is a slight loss of contrast in very low return areas. This effect becomes more pronounced at higher reduction levels. Lower intensity pixels not included in the radar discrete list are smoothed, but the higher intensity pixels are well preserved. The accurate preservation of these high intensity pixels is a primary aspect of the invention.

Given a SAR image data of size M×M, image encoding parameters, L, I, N and K can be predetermined to achieve the desired reduction factor R. However, the value N can be determined adaptively according to the signal-to-clutter ratios in a manner similar to that described above with respect to adaptive selection of the parameter L. Similarly, the value N can be set according to the value of RMS values of the magnitudes. The RMS value decreases exponentially as a function of a "radial" distance from the DC filter. The value N can be adaptively determined by saving all square annuli zones until the RMS value of the outmost annuli zone falls to a specified threshold.

It is understood that the above-described embodiment is merely illustrative of the many possible specific embodiments which can represent principles of the present invention. Other arrangements may be devised in accordance with these principles by those skilled in the art without departing from the scope of the invention.

What is claimed is:

1. A method for encoding synthetic aperture radar (SAR) image data, comprising a sequence of the following steps:

(i) extracting from the SAR image a set of the brightest radar discretes to form a set of radar discretes, comprising a sequence of the following steps:

(a) processing said SAR image to obtain a low frequency image containing only the low frequency components of the SAR image, comprising the following sequence of steps:

transforming said SAR image into the frequency domain, processing said transformed image data to retain the low frequency components thereof and zeroing the other frequency components, and performing an inverse transform on the processed image data back to the spatial domain, thereby obtaining a low frequency image version of the SAR image;
(b) removing the low frequency image from the SAR image to form a first difference image, and
(c) processing said first difference image to identify said set of radar discretes; and
(ii) processing said SAR image and said set of radar discretes to obtain background image data representing only the background clutter component of the SAR image;
whereby said SAR image is characterized by said background image data and said set of radar discretes.

2. The method of claim 1 wherein said step of processing said SAR image and said set of radar discretes comprises the steps of:
(i) extracting said set of radar discretes from said SAR image to obtain a second difference image;
(ii) transforming said second difference signal into the frequency domain by using a fast Fourier transformation resulting in an array of complex-valued filters to obtain an array of frequency filters;
(iii) discarding the higher frequency filters; and
(iv) quantizing the lower and middle frequency level filters.

3. A data compression encoder for encoding input synthetic aperture radar (SAR) image data representing an image comprising an array of pixels, and wherein each array value indicates the intensity level of a corresponding pixel, comprising:
first processing means for processing said image data to identify relatively high intensity pixels and their respective intensity values, said first processing means for defining a high intensity pixel data set representing the locations of said pixels and their respective intensity values;
second processing means for processing said input image data and said set to provide an array of frequency filters representing the spectral content of the relatively low intensity image background;
whereby said input image data is represented by said high intensity pixel data set and said array of frequency filters.

4. The invention of claim 3 wherein said input image data is logarithmically encoded, and said first processing means comprises:
low pass filter means for providing a low frequency component of said image data;
means for subtracting said low frequency component from said input image data to provide a first difference image; and
means for identifying the high intensity pixels in said first difference image.

5. The invention of claim 3 wherein said means for identifying the high intensity pixels comprises sorting means for sorting the pixels by intensity value and selecting a predetermined number of said pixels in descending order in accordance with their respective intensity levels.

6. The invention of claim 3 wherein said means for identifying the high intensity pixels in said difference image comprises means for comparing the respective pixel intensity to a predetermining threshold and identifying those pixels whose intensity level exceeds said threshold.

7. The encoder of claim 3 wherein said second processing means comprises:
means for extracting said high intensity pixel data set from said input image data to provide a second difference image;
Fourier transform means for transforming said second difference image into a transform array of frequency filters; and
means for extracting the higher frequency filters from said transform array and for providing said array of frequency filters.

8. The encoder of claim 7 wherein said means for extracting the higher frequency components from said transform array further further comprises quantizer means for quantizing the lower and middle frequency filters.

9. The encoder of claim 8 wherein said transform array comprises an inner group of low frequency filters centered about the zero frequency filter and a middle group of middle frequency filters centered about said zero frequency filter, and said quantizer is adapted to quantize the inner group of filters to a higher degree of precision than the middle group of filters.

10. A method for processing synthetic aperture radar (SAR) image data, comprising the step of encoding the SAR image data by:
(i) transforming the SAR image into the frequency domain to obtain a first frequency transform data set;
(ii) low pass filtering the transformed data set;
(iii) transforming the filtering data set back into the spatial domain to obtain a first low frequency version of the SAR image;
(iv) extracting the low frequency version from the SAR image to obtain a bright object version of the SAR image;
(v) removing the bright object version from said SAR image to obtain a background image;
(vi) transforming said background image into the frequency domain; and
(vii) low pass filtering the transformed background image data and quantizing the filtered image to obtain a set of low frequency image data,
whereby said SAR image data is encoded into said bright object image version and said set of low frequency image data.

11. The method of claim 10 wherein said SAR image data comprises a pixel matrix of digitized, logarithmically encoded data describing the image intensity at each pixel and wherein said step (iv) of extracting the filtered image from the SAR image comprises a pixel-by-pixel subtraction.

12. The method of claim 10 further comprising the step of decoding said encoding SAR image data into a reconstructed SAR image, comprising:
(viii) zero filling said set of low frequency image data to include higher frequency components of zero value;
(ix) transforming said zero-filled set back to the spatial domain to provide a second low frequency version of the SAR image; and
(x) adding said bright object image to said low frequency version to obtain the reconstructed SAR image.

13. A method for encoding synthetic aperture radar (SAR) image data, comprising a sequence of the following steps:
(a) extracting from the SAR image a set of the brightest radar discretes to form a set of radar discretes, said step comprising:

(i) processing said SAR image to obtain a low frequency image containing only the low frequency components of the SAR image;

(ii) removing the low frequency image from the SAR image to form a first difference image; and (iii) processing said first difference image to identify said set of radar discretes; and (b) processing said SAR image and said set of radar discretes to obtain background image data representing only the background clutter component of the SAR image;

whereby said SAR image is characterized by said background image data and said set of radar discretes.

14. The method of claim 13 wherein said step of processing said SAR image to obtain a low frequency image comprises:

transforming said SAR image into the frequency domain;

processing said transformed image data to retain the low frequency components thereof and zeroing the other frequency components; and performing an inverse transform on the processed image data back to the spatial domain, thereby obtaining a low frequency image version of the SAR image.

15. The method of claim 14 wherein said step of transforming said SAR image into the frequency domain comprises a fast Fourier transformation.

16. A method for encoding synthetic aperture radar (SAR) image data, comprising a sequence of the following steps:

(a) digitizing and logarithmically encoding said SAR image data into an array of pixels;

(b) extracting from said digitized and encoded SAR image data a set of the brightest radar discretes to form a set of radar discretes, comprising:

(i) filtering said SAR image data to provide a low frequency image, and (ii) subtracting said low frequency image from said SAR image pixel-by-pixel; and (c) processing said SAR image and said set of radar discretes to obtain background image data representing only the background clutter component of the SAR image;

whereby said SAR image is characterized by said background image data and said set of radar discretes.

17. A method for encoding synthetic aperture radar (SAR) image data, comprising a sequence of the following steps:

(a) extracting from the SAR image a set of the brightest radar discretes to form a set of radar discretes; and (b) processing said SAR image and said set of radar discretes to obtain background image data representing only the background clutter component of the SAR image, comprising:

(i) extracting said set of radar discretes from said SAR image to obtain a second difference image;

(ii) transforming said second difference signal into the frequency domain to obtain an array of frequency filters;

(iii) discarding the higher frequency filters; and (iv) quantizing the lower and middle frequency level filters;

whereby said SAR image is characterized by said background image data and said set of radar discretes.

18. The method of claim 17 wherein said step of transforming said second difference signal into the frequency domain comprises a fast fourier transformation resulting in an array of complex-valued filters.

* * * * *